(12) United States Patent
Yoon

(10) Patent No.: US 12,231,054 B2
(45) Date of Patent: Feb. 18, 2025

(54) MOTOR INTEGRATED INVERTER APPARATUS

(71) Applicants: HYUNDAI MOTOR COMPANY, Seoul (KR); Kia Corporation, Seoul (KR)

(72) Inventor: Jaehoon Yoon, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 197 days.

(21) Appl. No.: 17/861,690

(22) Filed: Jul. 11, 2022

(65) Prior Publication Data

US 2023/0041300 A1    Feb. 9, 2023

(30) Foreign Application Priority Data

Aug. 9, 2021    (KR) .................... 10-2021-0104288

(51) Int. Cl.
  *H02M 7/00* (2006.01)
  *H01G 2/08* (2006.01)
  *H02M 7/537* (2006.01)

(52) U.S. Cl.
  CPC .............. *H02M 7/003* (2013.01); *H01G 2/08* (2013.01); *H02M 7/537* (2013.01)

(58) Field of Classification Search
  CPC ......... H02M 7/003; H02M 7/537; H01G 2/08
  USPC ........................................... 361/704
  See application file for complete search history.

(56) References Cited

U.S. PATENT DOCUMENTS

| | | | | |
|---|---|---|---|---|
| 8,162,627 | B2* | 4/2012 | Hattori | F04B 39/121 310/71 |
| 8,848,370 | B2* | 9/2014 | Shin | B60K 6/22 361/698 |
| 9,059,620 | B2* | 6/2015 | Sato | H02M 7/003 |
| 9,610,846 | B2* | 4/2017 | Yoon | B60L 50/61 |
| 11,848,631 | B2* | 12/2023 | Yoon | H02K 11/215 |
| 2003/0200761 | A1* | 10/2003 | Funahashi | F04C 29/0085 62/228.4 |
| 2010/0074770 | A1* | 3/2010 | Hattori | F04B 39/121 417/410.1 |

(Continued)

FOREIGN PATENT DOCUMENTS

| | | |
|---|---|---|
| EP | 3 007 334 A2 | 4/2016 |
| EP | 3 141 459 B1 | 8/2020 |

(Continued)

OTHER PUBLICATIONS

Extended European Search Report issued in corresponding European Patent Application No. 22172512.0 dated Oct. 31, 2022.

*Primary Examiner* — Anatoly Vortman
(74) *Attorney, Agent, or Firm* — MORGAN, LEWIS & BOCKIUS LLP

(57) ABSTRACT

A motor integrated inverter apparatus includes a drive motor on which a decelerator is installed, and an inverter installed to be directly connected to the drive motor. The inverter includes an inverter cover installed on a side of the drive motor and having an installation space defined therein, a capacitor having the installation space defined in the inverter cover so that an end of the drive shaft is inserted into the installation space, a control board installed on a side of the capacitor, and a cooling part installed between the control board and the capacitor.

9 Claims, 9 Drawing Sheets

(56) References Cited

U.S. PATENT DOCUMENTS

| | | | |
|---|---|---|---|
| 2010/0327709 A1* | 12/2010 | Minato | H02K 11/33 |
| | | | 361/736 |
| 2011/0163705 A1* | 7/2011 | Sato | H02K 11/026 |
| | | | 318/400.24 |
| 2013/0039009 A1* | 2/2013 | Shin | B60K 6/22 |
| | | | 361/699 |
| 2013/0049495 A1* | 2/2013 | Matsuo | G06F 16/1748 |
| | | | 310/59 |
| 2014/0125164 A1* | 5/2014 | Mukunoki | H02K 11/33 |
| | | | 165/104.13 |
| 2016/0013706 A1* | 1/2016 | Mukunoki | H02K 11/026 |
| | | | 310/68 D |
| 2016/0056683 A1 | 2/2016 | Nakanishi et al. | |
| 2016/0105084 A1 | 4/2016 | Ishimaru et al. | |
| 2022/0190764 A1* | 6/2022 | Yoon | H02P 27/06 |

FOREIGN PATENT DOCUMENTS

| | | |
|---|---|---|
| JP | 4580997 B2 | 11/2010 |
| JP | 2013-115903 A | 6/2013 |
| JP | 5247745 B2 | 7/2013 |
| JP | 2014-183615 A | 9/2014 |
| JP | 6259893 B2 | 1/2018 |
| WO | 2020-219955 A1 | 10/2020 |

* cited by examiner

MOTOR INTEGRATED INVERTER APPARATUS

CROSS-REFERENCE TO RELATED APPLICATION

The present application claims the benefit of priority to Korean Patent Application No. 10-2021-0104288 filed on Aug. 9, 2021 in the Korean Intellectual Property Office, the entire contents of which are incorporated herein by reference.

BACKGROUND

(a) Field of the Disclosure

The present disclosure relates to a motor integrated inverter apparatus capable of utilizing an inner space and reducing manufacturing costs by optimizing a connection structure of a drive motor and an inverter.

(b) Description of the Related Art

Generally, eco-friendly vehicles are becoming high-efficiency and high-performance. Particularly, it is required for electric vehicles (EVs) and fuel cell electric vehicles (FCEV) to have a motor system mounted in a front wheel or a rear wheel, expand a space for passengers, and minimize spaces other than the space for passengers in order to utilize the space for passengers with development of autonomous driving technology.

Further, an important goal for electric vehicles (EVs) and fuel cell electric vehicles (FCEV) is to simplify parts and reduce the costs due to an increase in vehicle sales.

Since most of the motor integrated inverters are mounted in a cylindrical motor, optimization of a motor connection structure and inverter inner layout is essential to achieve the goal.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a motor integrated inverter apparatus capable of utilizing an inner space and reducing manufacturing costs by directly connecting an inverter to a drive shaft of a drive motor.

An exemplary embodiment of the present disclosure provides a motor integrated inverter apparatus including a drive motor on which a decelerator is installed, and an inverter installed to be directly connected to the drive motor.

The inverter includes an inverter cover installed on a side of the drive motor and having an installation space defined therein, a capacitor having the installation space defined in the inverter cover so that an end of the drive shaft is inserted into the installation space, a control board installed on a side of the capacitor, and a cooling part installed between the control board and the capacitor.

The control board may include a sensor protrusion protruding to the installation space.

The motor integrated inverter apparatus may further include an angle sensor and a temperature sensor installed on the sensor protrusion and connected to the control board by a sensor line, and a plurality of power modules connected to the control board and operated with direct current (DC)-to-alternating current (AC) conversion.

The drive shaft may have an opening in an end of the drive shaft located in the installation space of the capacitor, and an end of the sensor protrusion may be inserted into the opening.

A magnetic member for sensing the angle sensor may be installed on an inner wall surface of the opening of the drive shaft.

The cooling part may be installed between the control board and the capacitor, and include at least one cooling jacket having one side in contact with one of the power modules and another side in contact with the capacitor, and having a cooling passage included therein.

The at least one cooling jacket may include a first jacket longitudinally extending along a first side edge and a second side edge of the capacitor and connecting a portion between the first side edge and the second side edge in a round shape, a second jacket longitudinally extending along the first side edge while being in contact with the first jacket and connected to the first jacket, and a third jacket longitudinally extending along the second side edge from an upper side of the first jacket and connected to the first jacket.

The at least one cooling jacket may include a first jacket longitudinally extending along a first side edge and a second side edge of the capacitor and connecting an extended portion between the first side edge and the second side edge in a straight line shape, a second jacket longitudinally extending along the first side edge while being in contact with the first jacket and connected to the first jacket, and a third jacket longitudinally extending along the second side edge from an upper side of the first jacket and connected to the first jacket.

The first jacket may be disposed longitudinally along the first side edge of the capacitor, and have an end with a first bent portion bent in a first direction.

The second jacket may be disposed longitudinally along the second side edge of the capacitor, and have an end with a second bent portion bent in a second direction, which is a direction toward the end of the first bent portion.

The respective bent ends of the first bent portion and the second bent portion may be in contact with each other.

According to an exemplary embodiment of the present disclosure, the connection structure of the drive motor and the inverter is made by installing the inverter to be directly connected to the drive shaft of the drive motor, such that the connection structure may be stably made without changing the connection structure of the drive motor and the inverter.

According to an exemplary embodiment of the present disclosure, the inverter is installed to be directly connected to a side of the drive shaft without installing the inverter on the drive motor, such that an upper space of the drive motor may be secured, and thus an upper space of a front wheel/rear wheel motor system may be secured. Accordingly, an inner space for passengers may be expanded in accordance with equipment of new technology for vehicle and autonomous driving thereof and autonomous driving, such that the inner space may be effectively utilized.

According to an exemplary embodiment of the present disclosure, a resolver and a separate-type temperature sensor mounted in the conventional drive motor are removed and replaced with a chip-type angle/temperature sensor in the inverter to connect the chip-type angle/temperature sensor to the control board. Thus, manufacturing costs may be reduced due to removal of a connector for connecting the inside or outside of the conventional drive motor and reduction in connecting lines.

DETAILED DESCRIPTION OF THE EMBODIMENTS

Figure 1:
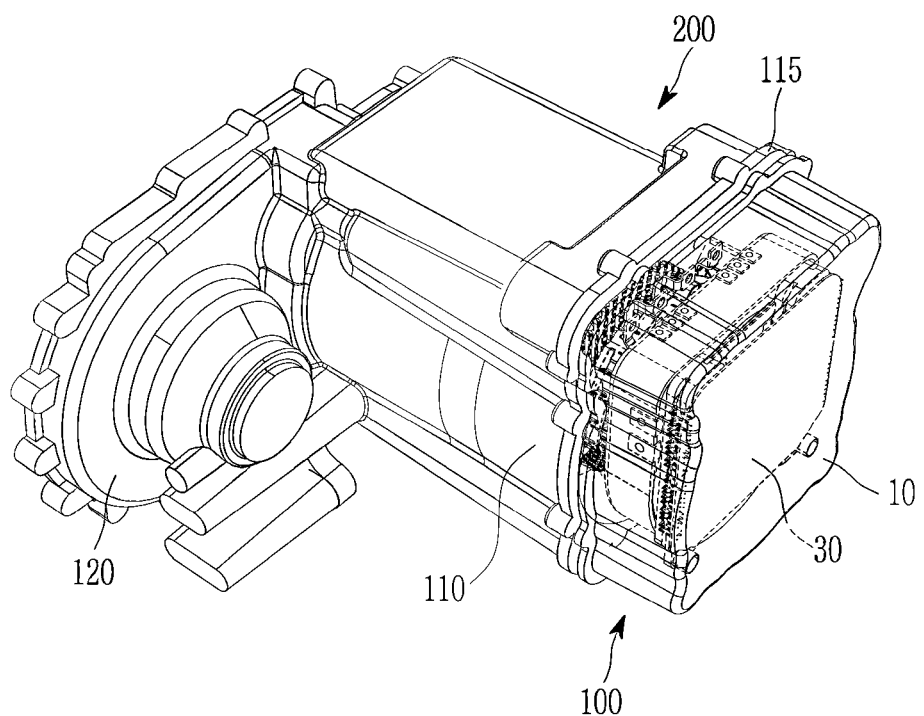
FIG. 1 is a perspective view schematically illustrating a motor integrated inverter apparatus according to an exemplary embodiment of the present disclosure.

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments provided herein. The drawings and description are to be regarded as illustrative in nature and not restrictive. Like reference numerals designate like elements throughout the specification.

Figure 2:
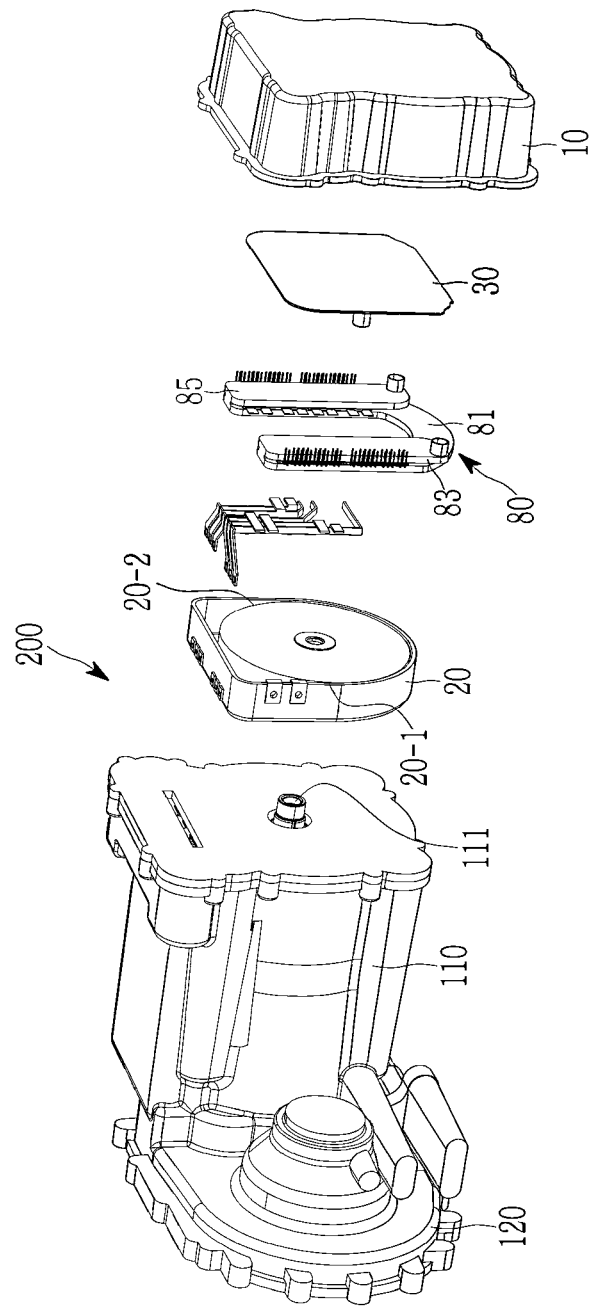
FIG. 2 is an exploded perspective view schematically illustrating the motor integrated inverter apparatus in FIG. 1.
Figure 3:
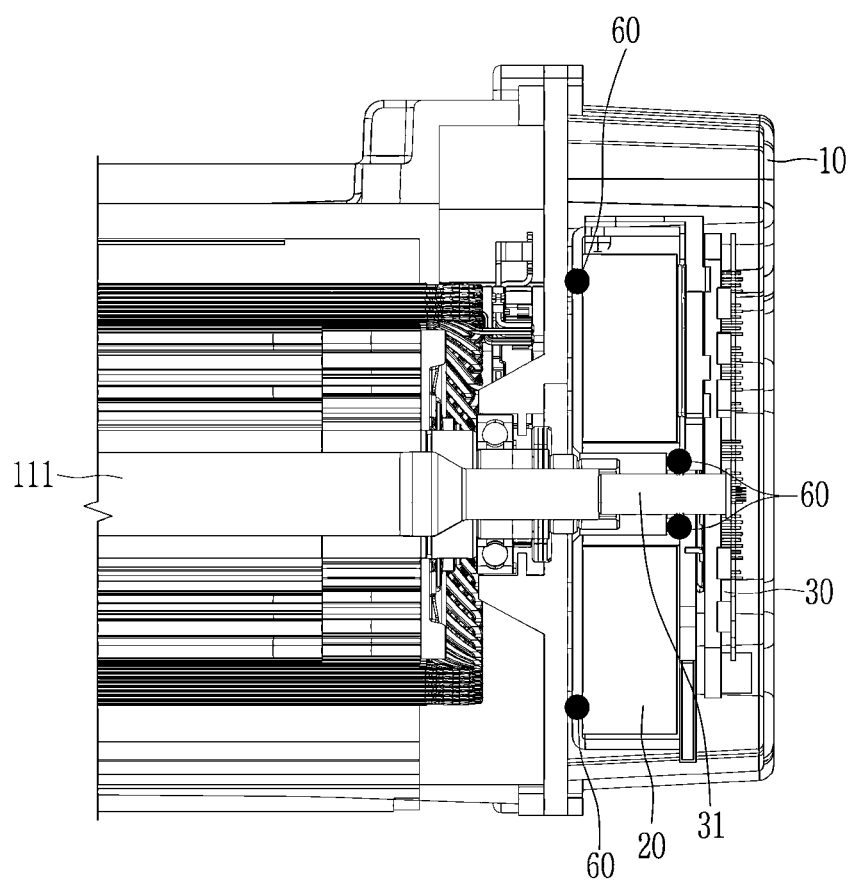
FIG. 3 is a main part cross-sectional view schematically illustrating a state in which an inverter and a drive motor are installed in a motor integrated inverter apparatus according to a first exemplary embodiment of the present disclosure.
Figure 4:
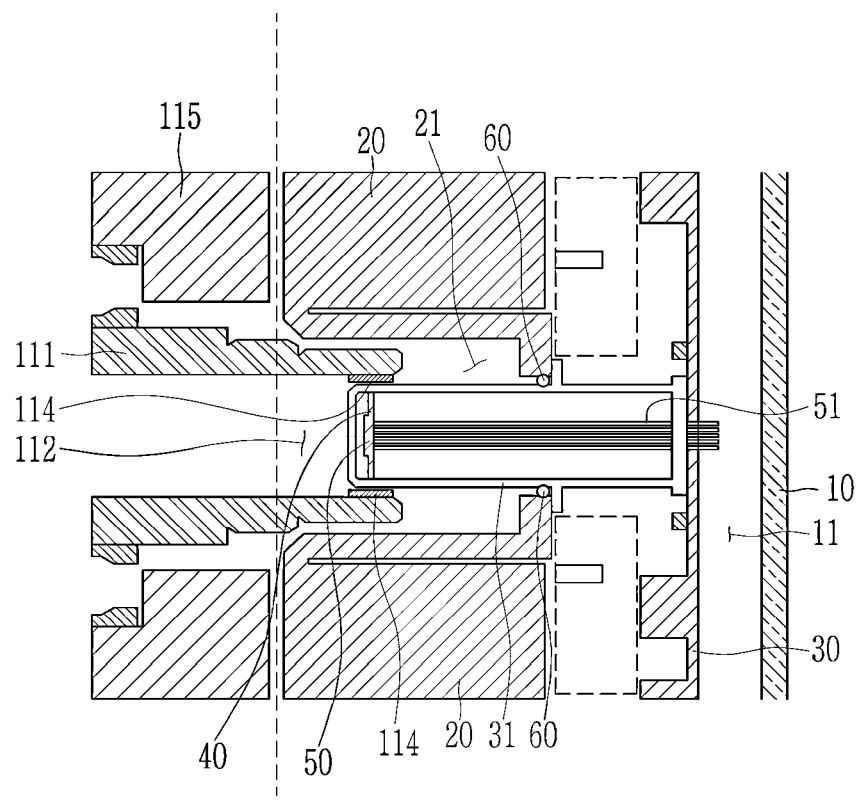
FIG. 4 is a main part cross-sectional view schematically illustrating a state in which an angle sensor and a temperature sensor are connected to a control board when a drive shaft and a sensor protrusion are connected to each other according to the first exemplary embodiment of the present disclosure.
Figure 5:
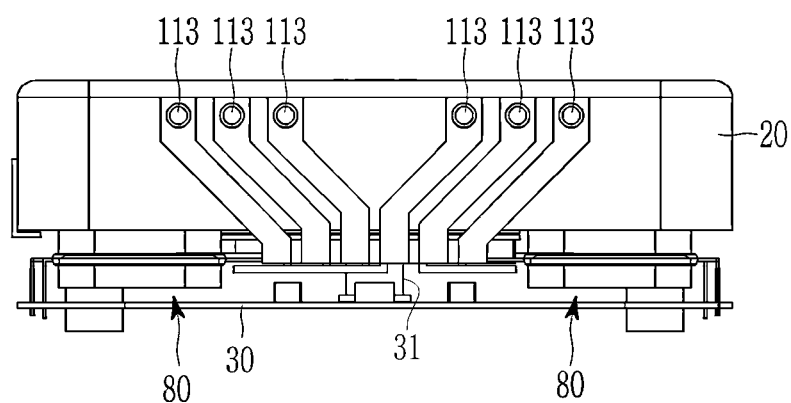
FIG. 5 is a plan view schematically illustrating a state in which the control board is installed in the inverter according to the first exemplary embodiment of the present disclosure.
Figure 6:
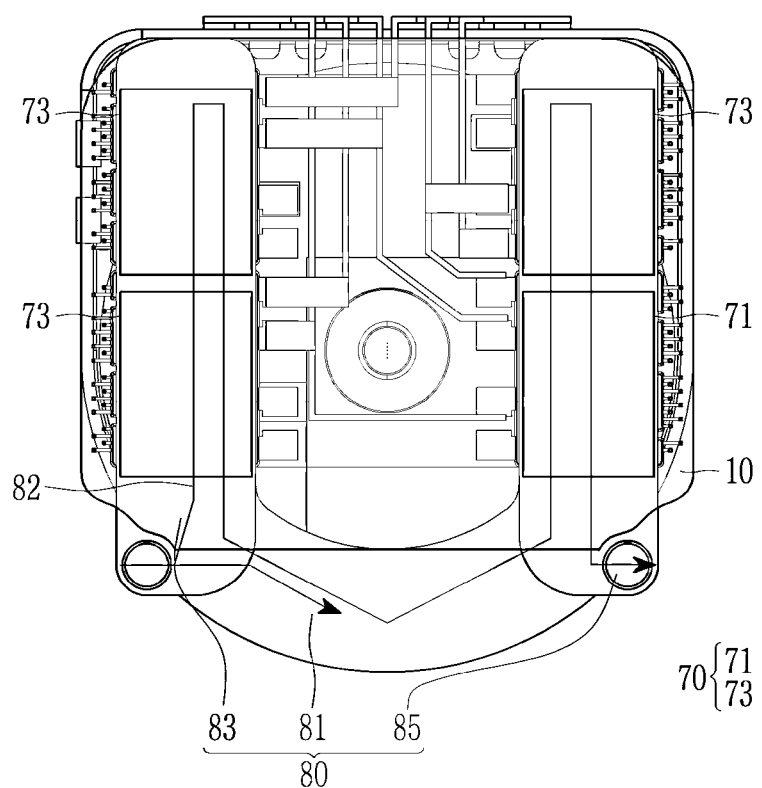
FIG. 6 is a view schematically illustrating a state in which a cooling part is installed at a power module position according to the first exemplary embodiment of the present disclosure.

FIG. 1 is a perspective view schematically illustrating a motor integrated inverter apparatus according to an exemplary embodiment of the present disclosure, FIG. 2 is an exploded perspective view schematically illustrating the motor integrated inverter apparatus in FIG. 1, FIG. 3 is a main part cross-sectional view schematically illustrating a state in which an inverter and a drive motor are installed in a motor integrated inverter apparatus according to a first exemplary embodiment of the present disclosure, FIG. 4 is a main part cross-sectional view schematically illustrating a state in which an angle sensor and a temperature sensor are connected to a control board when a drive shaft and a sensor protrusion are connected to each other according to the first exemplary embodiment of the present disclosure, FIG. 5 is a plan view schematically illustrating a state in which the control board is installed in the inverter according to the first exemplary embodiment of the present disclosure, and FIG. 6 is a side view schematically illustrating a state in which a cooling part is installed at a power module position according to the first exemplary embodiment of the present disclosure.

As illustrated in FIGS. 1 to 6, a motor integrated inverter apparatus 200 according to a first exemplary embodiment of the present disclosure includes a drive motor 110 on which a decelerator 120 is installed, and an inverter 100 installed to be directly connected to a drive shaft of the drive motor 110.

In a vehicle such as an electric vehicle or a fuel cell electric vehicle which is becoming high-efficiency and high-performance, the drive motor 110 may be mounted on a front wheel or a rear wheel thereof to transmit a driving torque.

In the drive motor 110, the inverter 100 may be installed to be directly connected to the drive shaft 111 that transmits a driving torque.

The drive shaft 111 may have an opening 112 extending inwardly from an end of a portion connected to the inverter 100. As such, forming the opening 112 in the drive shaft 111 is for partially inserting an end of a sensor protrusion 31 of the inverter 100 into the opening 112. This will be described in detail while describing the inverter 100 below. The reference numeral "~" refers to a decelerator.

As described above, the inverter 100 is installed to be directly connected to the drive shaft 111, and may be installed to be located on a straight line in the same direction as a length direction of the drive motor 110.

As such, the inverter 100 is installed to be located on a straight line in the length direction of the drive motor 110. Thus, a portion of the inverter 100 protruding to a side of the drive motor 110 may not be formed, and the inverter 100 may be easily installed without changing the existing connection structure of the drive motor 110 and the inverter 100. This will be described in more detail while describing the inverter 100 below.

The drive motor 110 and the inverter 100 may be connected with two sets of high voltage three phases (six terminals) 113.

The inverter 100 may include an inverter cover 10 installed on the side of the drive motor 110 and having an installation space 21 defined therein, a capacitor 20 having the installation space 21 defined in the inverter cover 10 so that the end of the drive shaft 111 is inserted into the insertion space 21, a control board 30 installed on a side of the capacitor 20 and having a sensor protrusion protruding to the installation space 21, an angle sensor 40 and a temperature sensor 50 installed on the capacitor 20 and connected to the control board 30 by a sensor line 51, a plurality of power modules 70 connected to the control board 30, and a cooling part 80 installed between the control board 30 and the capacitor 20.

The inverter cover 10 has the installation space 21 defined therein, and the installation space 21 may be installed between the side of the drive motor 110 and the inverter cover 10. That is, the inverter cover 10 may be detachably installed so that the installation space 21 is arranged between a motor cover 115 installed on the side of the drive motor 110 and the inverter cover 10. The inverter cover 10 may be installed on the side of the drive motor 110 so that air in the installation space 21 may be kept tight.

The capacitor 20 may be installed in the installation space 21 of the inverter cover 10.

The capacitor 20, which functions as a filter, may have the insertion space 21 penetrating therethrough.

The end of the drive shaft 111 may be partially inserted into the insertion space 21 of the capacitor 20.

As such, in a state in which the end of the drive shaft 111 is inserted into the insertion space 21 of the capacitor 20, the end of the sensor protrusion 31 of the control board 30, which will be described later, may be inserted into the drive shaft 111.

The control board 30 includes the sensor protrusion 31 installed on the side of the capacitor 20 and protruding to the insertion space 21, and may be installed in a state in which the angle sensor 40 and the temperature sensor 50, which are installed on the sensor protrusion 31, are connected to each other by the sensor line 51. The control board 30 may be installed for appropriately controlling drive of the drive motor.

The sensor protrusion 31 is installed in a state in which the end thereof is partially inserted into the opening 112 of the drive shaft 111, and the angle sensor 40 and the temperature sensor 50 may be installed in the end of the sensor protrusion 31.

The angle sensor 40 may be installed to sense a rotation position, instead of the conventional resolver. Meanwhile, a magnetic member 114 for sensing the rotation position may be installed on an inner wall surface of the opening 112 of the drive shaft 111. Therefore, the angle sensor 40 may be installed to enable calculation of a rotation angle according to sensing of change in magnetic field.

The angle sensor 40 may be connected to the control board 30 by the sensor line 51 and installed to transmit a sensing signal of the rotation position to the control board 30.

The temperature sensor 50 may be installed on the sensor protrusion 31 to sense a temperature in order to cool the power module 70. The temperature sensor 50 may be installed on the control board 30 by the sensor line 51.

Meanwhile, a sealing member 60 may be installed at a position between the inner wall surface of the insertion space 21 of the capacitor 20 and the sensor protrusion 31. The sealing member 60 may be applied as a gasket. As illustrated in FIG. 3, the sealing member 60 may be installed between the motor cover 115 and the capacitor 20.

Therefore, it is possible to properly prevent foreign matters from flowing into the control board 30 in an operation procedure of the inverter.

The power module 70 may be installed to convert a direct current (DC) to an alternating current (AC) with a switching operation.

A case in which four power modules 70 are installed in the present exemplary embodiment will be described by way of example. That is, the power module 70 may include one transfer switch 71 and three silicon (Si)-silicon carbide (SiC) modules 73.

The power module 70 may be cooled to a proper temperature by the cooling part 80 installed between the control board 30 and the capacitor 20.

The cooling part 80 may be installed between the control board 30 and the capacitor 20, and may be applied as a cooling jacket having one side in contact with the power module 70 and the other side in contact with the capacitor 20, and having a cooling passage 82 included therein.

More specifically, the cooling part 80 may include a first jacket 81 having portions longitudinally extending along a first side edge 20-1 and a second side edge 20-2 of the capacitor 20 and an extended portion (indicated as "81" in FIG. 6) connecting between the portions extending along the first side edge 20-1 and the second side edge 20-2 in a round shape, a second jacket 83 longitudinally extending along the first side edge 20-1 while being in contact with the first jacket 81 and connected to the first jacket 81, and a third jacket 85 longitudinally extending along the second side edge 20-2 while being in contact with the first jacket 81 and connected to the first jacket 81.

The first jacket 81 may be installed in a state in which one side is in contact with the capacitor 20, and may be installed to have a U shape by longitudinally extending the first jacket 81 from each of the first side edge 20-1 and the second side edge 20-2 of the capacitor 20 and connecting between the first side edge 20-1 and the second side edge 20-2 in a round shape.

The first jacket 81 may have the cooling passage 82 included therein along a length direction of the capacitor 20, and may be installed to properly keep the temperature of the capacitor 20 according to supply of a coolant.

The second jacket 83 may be connected to one side of the first jacket 81 while being in contact with each other.

The second jacket 83 may be installed while longitudinally extending along the first side edge 20-1 in a state in which the second jacket 83 is in contact with the first jacket 81, and may be connected to the cooling passage 82 of the first jacket 81.

That is, the second jacket 83 may extend in an I shape, and may be installed to be in contact with the first jacket 81 along the first side edge 20-1 of the capacitor 20.

The third jacket 85 may be connected to the other side of the first jacket 81 while being in contact with each other.

The third jacket 85 may be installed while longitudinally extending along the second side edge 20-2 in a state in which the third jacket 85 is in contact with the first jacket 81, and may be connected to the cooling passage 82 of the first jacket 81.

That is, the third jacket 85 may extend in an I shape, and may be installed to be in contact with the first jacket 81 along the second side edge 20-2 of the capacitor 20.

The power module 70 is installed on the second jacket 83 and the third jacket 85 in a contact state, such that a cooling action of the power module 70 may be performed.

The power module 70 is connected to the control board 30 and operates with the AC-DC conversion, and may include one transfer switch 71 and three silicon (Si)-silicon carbide (SIC) modules 73.

Here, two Si—SiC modules 73 are installed to be in contact with the second jacket 83, and one transfer switch 71 and one Si—SiC module 73 are installed while being in contact with the third jacket 85. Thus, the power module 70 may be properly cooled according to the cooling action of the cooling part 80.

As described above, in the motor integrated inverter apparatus 200 according to the present exemplary embodiment, the connection structure of the drive motor 110 and the inverter 100 is made by installing the inverter to be directly connected to the drive shaft 111, such that the connection structure may be stably made without changing the connection structure of the drive motor 110 and the inverter 100.

In addition, the inverter 100 is installed to be directly connected to the side of the drive shaft 111, without being installed on the drive motor 110, such that an upper space of the drive motor 110 may be secured, and thus an upper space for a front wheel/rear wheel motor system may be secured. Accordingly, an inner space for passengers may be expanded in accordance with equipment of new technology for vehicle and autonomous driving thereof and autonomous driving, such that the inner space may be effectively utilized.

Furthermore, the resolver and a separate-type temperature sensor mounted in the conventional drive motor are removed and replaced with a chip-type angle/temperature sensor in the inverter 100 to connect the chip-type angle/temperature sensor to the control board 30. Thus, manufacturing costs may be reduced due to removal of a connector for connecting the inside or outside of the conventional drive motor and reduction in connecting lines.

Figure 7:
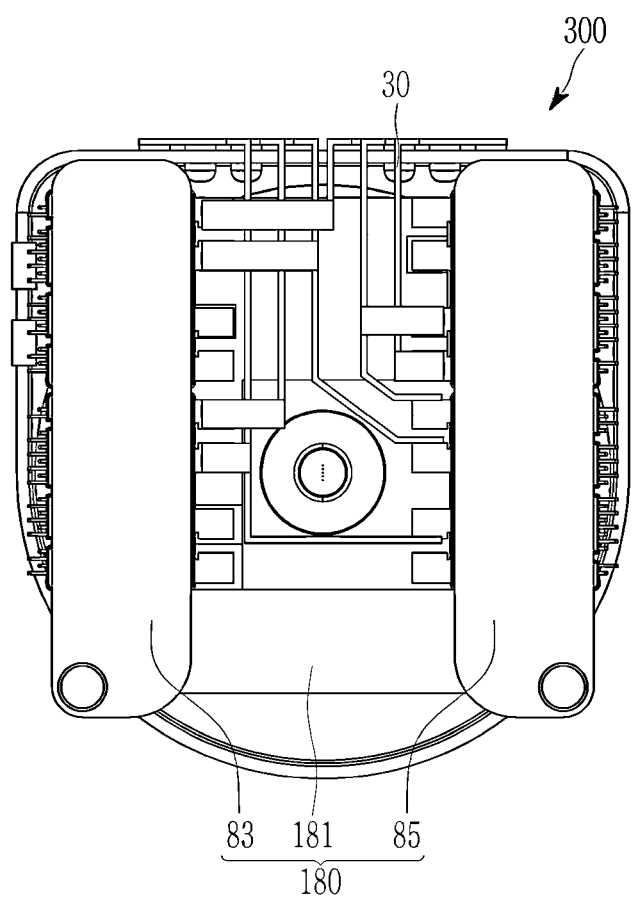
FIG. 7 is a side view schematically illustrating a state in which a cooling part is installed at a power module position according to a second exemplary embodiment of the present disclosure.

FIG. 7 is a side view schematically illustrating a state in which a cooling part is installed at a power module position according to a second exemplary embodiment of the present disclosure. The same reference numerals as those in FIGS. 1 to 6 refer to the same or similar members having the same or similar functions. Hereinafter, detailed descriptions of the same reference numerals will be omitted.

As illustrated in FIG. 7, according to a second exemplary embodiment of the present disclosure, an inverter 300 of a motor integrated inverter apparatus may include a first jacket 181 having portions longitudinally extending along a first side edge 20-1 and a second side edge 20-2 of the capacitor and an extended portion (indicated as "181" in FIG. 7) connecting between the portions extending along the first side edge 20-1 and the second side edge 20-2 in a straight line shape, a second jacket 83 longitudinally extending along the first side edge 20-1 while being in contact with the first jacket 181 and connected to the first jacket 181, and a third jacket 85 longitudinally extending along the second side edge 20-2 from an upper side of the first jacket 181 and connected to the first jacket 181.

Here, a shape of the portion connecting a position of the first side edge 20-1 and a position of the second side edge 20-2 may be changed and applied from the round shape of the first exemplary embodiment to a straight line shape. Thus, the cooling part 80 may be changed or applied to an appropriate shape according to the installation position and structure.

Figure 8:
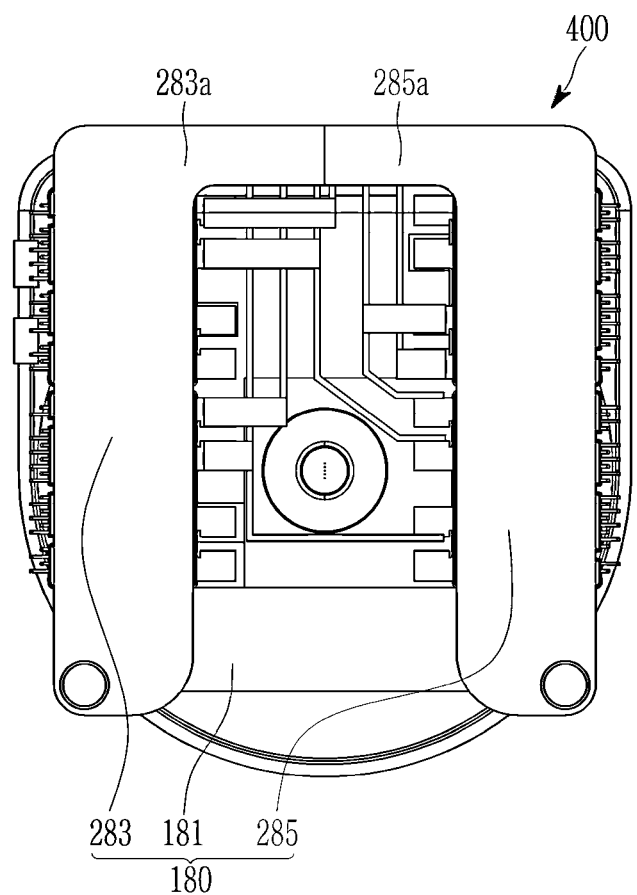
FIG. 8 is a side view schematically illustrating a state in which a cooling part is installed at a power module position according to a third exemplary embodiment of the present disclosure.

FIG. 8 is a side view schematically illustrating a state in which a cooling part is installed at a power module position according to a third exemplary embodiment of the present disclosure. The same reference numerals as those in FIGS. 1 to 7 refer to the same or similar members having the same or similar functions. Hereinafter, detailed descriptions for the same reference numerals will be omitted.

As illustrated in FIG. 8, according to a third exemplary embodiment of the present disclosure, an inverter 400 of a motor integrated inverter apparatus may include a first jacket 181 having portions longitudinally extending along a first side edge 20-1 and a second side edge 20-2 of the capacitor and an extended portion (indicated as "181" in FIG. 8) connecting between the portions extending along the first side edge 20-1 and the second side edge 20-2 in a straight line shape, a second jacket 283 longitudinally extending along the first side edge 20-1 while being in contact with the first jacket 181 and connected to the first jacket 181, and a third jacket 285 longitudinally extending along the second side edge 20-2 from an upper side of the first jacket 181 and connected to the first jacket 181.

Here, the second jacket 283 may be longitudinally disposed along the first side edge 20-1 of the capacitor 20, and may have an end with a first bent portion 283a bent in a first direction.

In addition, the third jacket 285 may be longitudinally disposed along the second side edge 20-2 of the capacitor 20, and may have an end with a second bent portion 285a bent in a second direction, which is a direction toward the end of the first bent portion 283a.

As such, the first bent portion 283a of the second jacket 283 and the second bent portion 285a of the third jacket 285 are installed to be bent in a direction facing each other in a state in which both ends of the second jacket 283 and the third jacket 285 are in contact with each other. Thus, a cooling area of the capacitor 20 may be increased, and the cooling action of the power module 70 may be effectively performed.

Figure 9:
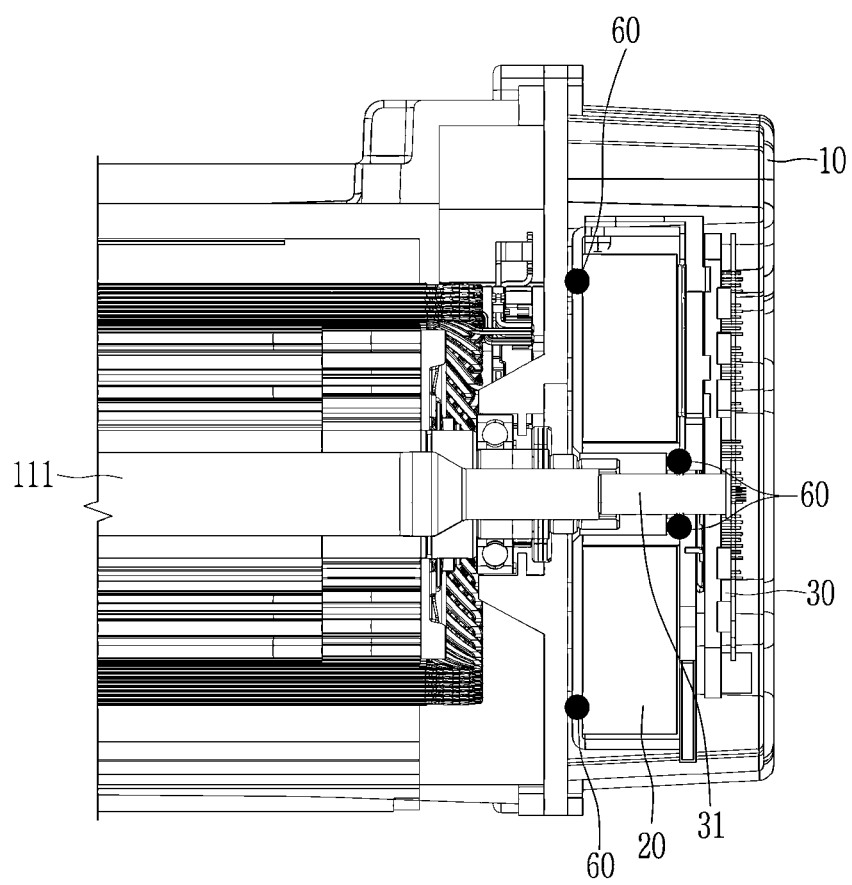
FIG. 9 is a main part cross-sectional view schematically illustrating a state in which an inverter and a drive motor are installed in a motor integrated inverter apparatus according to a fourth exemplary embodiment of the present disclosure.

FIG. 9 is a main part cross-sectional view schematically illustrating a state in which an inverter and a drive motor are installed in a motor integrated inverter apparatus according to a fourth exemplary embodiment of the present disclosure. The same reference numerals as those in FIGS. 1 to 8 refer to the same or similar members having the same or similar functions. Hereinafter, detailed descriptions for the same reference numerals will be omitted.

As illustrated in FIG. 9, in an inverter of a motor integrated inverter apparatus according to a fourth exemplary embodiment of the present disclosure, a motor cover 115 may be integrally formed with a capacitor 20.

A sealing member 60 may be installed at a position between an inner wall surface of an insertion space 21 of the capacitor 20 and a sensor protrusion 31.

That is, in the present exemplary embodiment, the sealing member 60 may be independently installed only at a position between the inner wall surface of the insertion space 21 of the capacitor 20 and the sensor protrusion 31 by removing the sealing member 60 installed between the motor cover 115 of the first exemplary embodiment and the capacitor 20.

Hereinafter, preferred exemplary embodiments of the present disclosure have been described above, but the present disclosure is not limited thereto, and may be embodied by being modified in various ways within the scope of the claims, the detailed description, and the accompanying drawings. Such modifications belong to the scope of the present disclosure.

<Description of symbols>

| | |
|---|---|
| 10 . . . inverter cover | 20 . . . capacitor |
| 21 . . . insertion space | 30 . . . control board |
| 31 . . . sensor protrusion | 40 . . . angle sensor |
| 50 . . . temperature sensor | 51 . . . sensor line |
| 60 . . . sealing member | 70 . . . power module |
| 71 . . . transfer switch | 73 . . . silicon (Si)-silicon carbide (SiC) module |
| 80 . . . cooling part | 81, 181 . . . first jacket |
| 82 . . . cooling passage | 83, 283 . . . second jacket |
| 85, 285 . . . third jacket | 100 . . . inverter |
| 110 . . . drive motor | 111 . . . drive shaft |
| 112 . . . opening | |
| 113 . . . two sets of high voltage three phases (six terminals) | |
| 115 . . . motor cover | |

What is claimed is:

1. A motor integrated inverter apparatus comprising:
   a drive motor on which a decelerator is installed; and
   an inverter installed and directly connected to a drive shaft of the drive motor,
   wherein the inverter includes:
   an inverter cover installed on a side of the drive motor and having an installation space defined therein;
   a capacitor disposed in the installation space defined in the inverter cover so that an end of the drive shaft is inserted into the installation space;
   a control board installed on a side of the capacitor; and
   a cooling part installed between the control board and the capacitor, wherein the control board includes a sensor protrusion protruding to the installation space, and wherein the apparatus further comprises:
an angle sensor and a temperature sensor installed on the sensor protrusion and connected to the control board by a sensor line; and
a plurality of power modules connected to the control board and operated with direct current (DC)-to-alternating current (AC) conversion.

2. The motor integrated inverter apparatus of claim 1, wherein:
the drive shaft has an opening in the end of the drive shaft located in the installation space of the capacitor, and
an end of the sensor protrusion is inserted into the opening.

3. The motor integrated inverter apparatus of claim 2, wherein
a magnetic member for sensing the angle sensor is installed on an inner wall surface of the opening of the drive shaft.

4. The motor integrated inverter apparatus of claim 3, wherein
the cooling part includes at least one cooling jacket having one side in contact with one of the power modules and another side in contact with the capacitor, and having a cooling passage included therein.

5. The motor integrated inverter apparatus of claim 4, wherein:
the at least one cooling jacket includes:
a first jacket having portions longitudinally extending along a first side edge and a second side edge of the capacitor and an extended portion connecting between the portions extending along the first side edge and the second side edge in a round shape;
a second jacket longitudinally extending along the first side edge while being in contact with the first jacket and connected to the first jacket; and
a third jacket longitudinally extending along the second side edge from an upper side of the first jacket and connected to the first jacket.

6. The motor integrated inverter apparatus of claim 4, wherein:
the at least one cooling jacket includes:
a first jacket having portions longitudinally extending along a first side edge and a second side edge of the capacitor and an extended portion connecting between the portions extending along the first side edge and the second side edge in a straight line shape;
a second jacket longitudinally extending along the first side edge while being in contact with the first jacket and connected to the first jacket; and
a third jacket longitudinally extending along the second side edge from an upper side of the first jacket and connected to the first jacket.

7. The motor integrated inverter apparatus of claim 6, wherein
the first jacket is disposed longitudinally along the first side edge of the capacitor, and has an end with a first bent portion bent in a first direction.

8. The motor integrated inverter apparatus of claim 7, wherein
the second jacket is disposed longitudinally along the second side edge of the capacitor, and has an end with a second bent portion bent in a second direction, which is a direction toward the end of the first bent portion.

9. The motor integrated inverter apparatus of claim 8, wherein
respective bent ends of the first bent portion and the second bent portion are in contact with each other.

* * * * *